United States Patent [19]

Choi et al.

[11] Patent Number: 5,154,988

[45] Date of Patent: Oct. 13, 1992

[54] DEEP CYCLE BATTERY SEPARATORS

[75] Inventors: Wai M. Choi, West Newton; James K. Kung, Lexington, both of Mass.

[73] Assignee: W. R. Grace & Co.-Conn., New York, N.Y.

[21] Appl. No.: 663,213

[22] Filed: Mar. 18, 1991

[51] Int. Cl.⁵ ............................................. H01M 2/16
[52] U.S. Cl. .................................... 429/145; 429/142; 429/144; 429/252; 429/254; 429/225
[58] Field of Search ............... 429/142, 144, 145, 252, 429/254, 225

[56] References Cited

U.S. PATENT DOCUMENTS

| | | | |
|---|---|---|---|
| 1,087,637 | 2/1914 | Carpenter | 429/254 |
| 3,351,495 | 11/1967 | Larsen et al. | 136/146 |
| 3,753,784 | 8/1973 | Eisenacher et al. | 429/145 |
| 3,910,799 | 10/1975 | Kondo et al. | 429/246 |
| 4,205,122 | 5/1980 | Miura et al. | 429/144 |
| 4,216,281 | 8/1980 | O'Rell et al. | 429/252 |
| 4,265,985 | 5/1981 | O'Rell et al. | 429/225 |

FOREIGN PATENT DOCUMENTS 0121169 11/1984 European Pat. Off. ............ 429/145
2106870 4/1990 Japan .

*Primary Examiner*—Asok Pal
*Assistant Examiner*—C. Everhart
*Attorney, Agent, or Firm*—John Dana Hubbard; William L. Baker

[57] ABSTRACT

A battery separator for use in deep cycle traction batteries, such as golf cart batteries. The separator is formed of a microporous, mainly polymeric layer, preferably in the form of a synthetic paper; a glass mat layer adjacent one surface of the microporous layer; and a coating on one or both sides of the mircoporous layer/glass mat combination. The coating is preferably formed of natural rubber which positively affects top-of-charge behavior and reduces the possibility of antimony poisoning, thus providing for longer and improved battery performance and life.

20 Claims, 1 Drawing Sheet

DEEP CYCLE BATTERY SEPARATORS

The present invention relates to a battery separator for use in deep cycle batteries. More particularly, the present invention relates to a battery separator for use in traction batteries, such as golf cart batteries.

BACKGROUND OF THE INVENTION

Motive or traction batteries, such as those designed for fork lifts or golf carts must be capable of providing steady power over an extended Period of time (such as 8 or more hours before recharging). They must also be able to be recharged without careful or frequent supervision.

These batteries are of the lead acid type having one or more positive plates and negative plates with a battery separator there between and an acid electrolyte, generally based upon sulphuric acid. Such batteries have traditionally used a Porous hard rubber (sulfur cross-linked rubber) separator between the lead plates. Such separators are particularly favored for traction batteries as they provide adequate strength and ionic flow with little dendritic growth over a long life span (up to 20 years in some instances). However, such separators have some drawbacks. Most importantly, such separators are difficult and costly to produce and their availability is somewhat limited due to few available suppliers. Moreover, the separators are heavy, brittle and relatively thick which reduce electrolyte storage capacity and increase battery weight.

Alternatives have been tried, but most have failed to gain widespread acceptance by the battery industry. One such alternative has been to use a microporous, phenolaldehyde resin impregnated paper sheet separator to one side of which a glass mat layer has been bonded. It however, has not been able to provide performance comparable to that of the hard rubber separators.

All separators used in these traction batteries suffer from several Problems during use, all of which tend to shorten the life and power of the battery.

The first Problem is known as "the top of charge" or "top of voltage" phenomenon. The typical battery charger used for traction batteries has no battery temperature or current sensor for determining when the battery is completely recharged. Rather, it is a simple device which supplies a high voltage to a battery until the operator or a timer causes the device to stop supplying the voltage. In some instances, the charger does not stop supplying the voltage before the battery is completely charged, thus causing the battery to become overcharged. This tends to occur more frequently as the age of the battery becomes greater. During an overcharge situation, the components of the battery, in particular the plates and the separators, become subjected to high temperatures which increase their suseptibiltiy to oxidation or "burning" and thereby shorten the battery's life.

Second, in those instances where the lead used in the battery plates contains antimony, the batteries are suseptible to antimony poisoning. Antimony is often a desirable component of the lead alloy used in forming the plates of the battery in that it forms harder, more acid resistant plates. Antimony, however, tends to dissolve from the positive plate, due to oxidation and other forces within the battery especially during overcharged conditions and travel through the separator to the negative plate where it plates out on the surface of the plate. The plated out antimony reduces the active surface area of the negative plate and hereby reduces the capacity and voltage behavior of the battery.

Lastly, dendritic growth occurs through the separator causing the adjoining plates to short.

The present invention provides an alternative to the known separators, which invention overcomes the problem of top of charge, antimony Poisoning and reduces the extent of dendritic growth.

SUMMARY OF THE INVENTION

The present invention is a multilayered battery separator for traction batteries formed of a microporous base web, a glass mat layer and a natural rubber coating layer formed on an exposed surface of the base web, or on an exposed surface of the glass mat layer or both.

IN THE DRAWINGS

FIG. 1 shows one embodiment of a battery separator made according to the present invention.

DETAILED DESCRIPTION OF THE INVENTION

Figure 1:
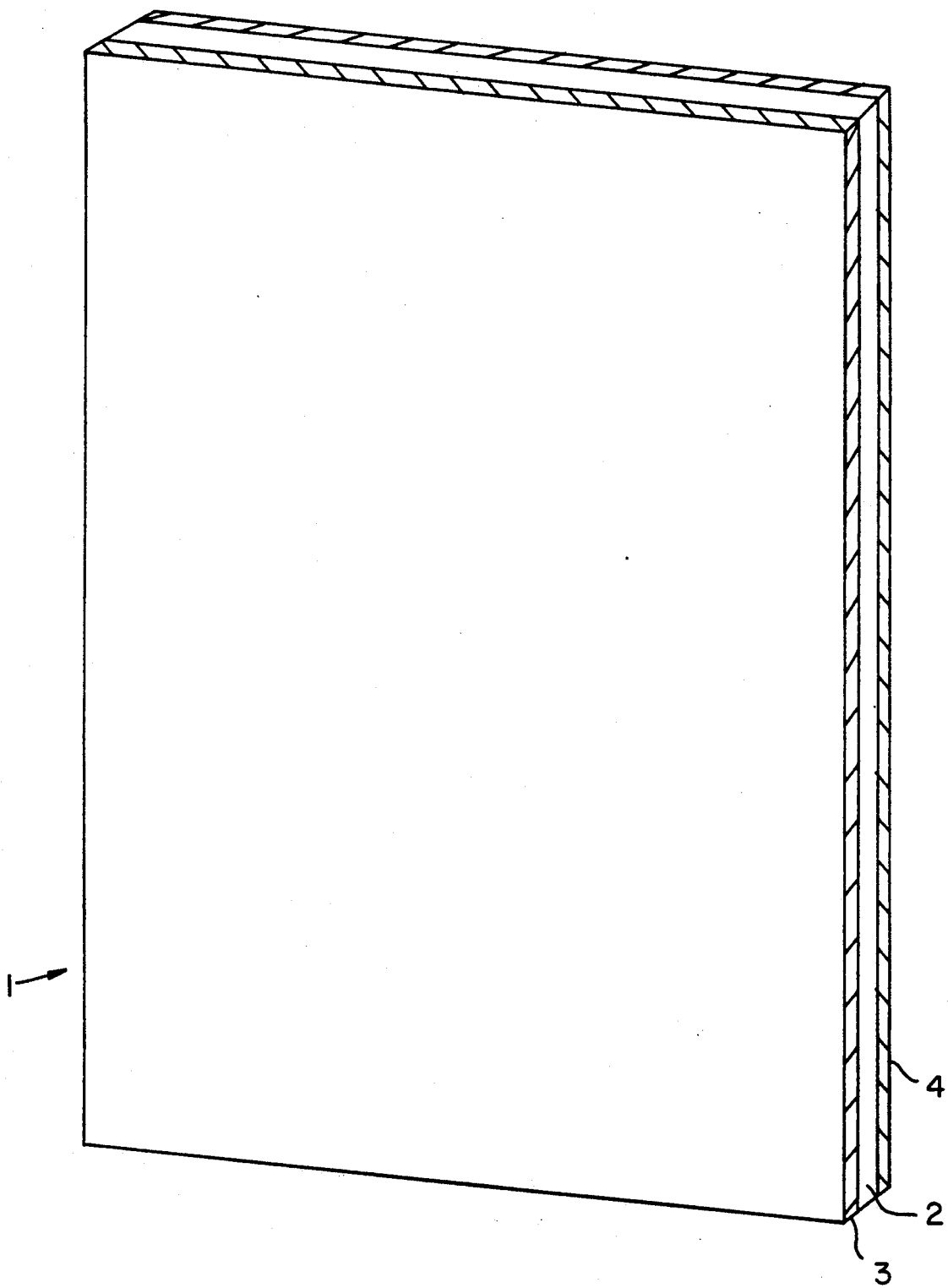

FIG. 1 shows a planar, partial cross sectional view of a battery separator according to the present invention.

The battery separator, 1, is comprised of three layers; a base web 2, a glass mat 3 and a natural rubber coating 4 on at least one of the exposed surfaces of either the base web 2 or the glass mat 3. The glass mat and base web are bonded together, preferably at their respective outer margins. Suitable means for bonding include heat sealing, adhesives, various mechanical means, such as clips, or crimping and other means for bonding two layers together as are well known in the art.

The base web 2 can be formed of any microporous sheet material. Preferably, the base web is formed of a microporous material that is inert in a lead/acid battery environment. Moreover, it should be fairly stiff as one requirement of the separator is to maintain a constant pressure against the active materials, especially on the positive plates, thereby keeping the materials in place. The base web may be flat or have a series of ribs formed upon one or both of its surfaces. Such ribs and their formation are well known in the art. Ribs may be formed separately on a flat sheet by extruding a PVC plastisol or a hot melt polyolefin material in narrow strips onto the flat sheet's surface. Alternatively, the ribs may be formed during the formation of the base web by calendaring, embossing or molding.

The selected base web should have a backweb thickness of from about 10 to about 50 mils, and most preferably about 20 mils. By backweb thickness it is meant the thickness of the separator excluding the thickness of any ribs. The average pore size should be less than 10 microns, preferably less than 7 microns, more preferably less than about 5 microns. The base web should have sufficient strength and rigidity so as to be self supportive and form stable both during manufacture of the separator and during use in the battery.

Preferred base webs include a microporous, polyolefinic, homogeneous sheet formed by extrusion, such as is taught by U.S. Pat. No. 3,351,495, which is incorporated herein by reference in its entirety. Another preferred baseweb is a synthetic paper formed of a synthetic polymeric pulp, various polymeric and/or glass fibers, an inorganic filler such as silica or diatomaceous earth and one or more staple, long fibers, having a length of at least 0.25 inch and a dernier of about 1.5 to about 12. Such a base web and a method for making it is taught in U.S. Pat. Nos. 4,216,281 and 4,265,985, which are incorporated herein by reference in their entireties. A more preferred baseweb is formed of a synthetic paper comprised of a small amount of synthetic pump (1-20% by weight), from about 1 to about 20% by weight of a staple fiber, such as a polyester or polyethylene or acrylic fiber, from about 40 to 60% by weight of one or more glass fibers, and the remainder of the separator comprising an inorganic filler, such as silica and small amounts of alum and other retention aids such as catonic or anionic copolymers, including cationically or anionically modified high molecular weight polyacrylamides. The base web is formed according to the methods of U.S. Pat. Nos. 4,216,281 and 4,265,985 and then preferably impregnated with a latex binder system which provides additional rigidity to the base web. Such binders are well known and can be formed of epoxy resins, phenolic resins, acrylic resins styrene based resins and blends thereof. A preferred binder is formed of a blend of a carboxylated polystyrene latex and a phenolic resin in about equal proportions (as measured by weight of solids). The amount of latex applied to and retained by the base web should be sufficient to increase rigidity, but less than that which may adversely affect the characteristics of the base web or the finished separator. Generally, about 3 to about 15% of the latex by weight of the base web should be retained in the base web.

Other materials, such as polyvinyl chloride sheets or phenolic aldehyde impregnated cellulosic sheets may also be used in forming the base web so long as they are compatible in the lead/acid system and provide the required porosity and rigidity.

The glass mat may be formed of a commercially available glass mat, such as DURA-GLASS MAT available from Manville Alternatively and preferably, it is formed of a blend of one or more glass fibers, small amounts of a staple, long plastic fiber such as Polyester, polyethylene or an acrylic fiber (1-15% by weight) and/or small amounts of synthetic pulp, such as polyethylene pulp (1-15% by weight). Preferably, two or more glass fibers are used, one relatively small in length and diameter and the other being a long fiber. The glass mat is formed by a wet paper making process as disclosed in U.S. Pat. Nos. 4,216,281 and 4,265,985 and is then impregnated with a flexible latex, such as an acrylic latex and dried. This preferred glass mat has several advantages over the glass mat currently offered. It has a smaller average pore size, about 70 to 85 microns diameter (as compared to about 160 microns for commercially available mats) and it is not as brittle or inflexible as commercially available glass mats due to the use of the plastic and the latex binder. The processes of U.S. Pat. Nos. 4,216,281 and 4,265,985 are particularly useful in forming this glass mat.

The glass mat should be essentially the same width as the base web to which it is bonded. In those instances where the separators are formed as separate pieces, the glass mat should also be the same height. It should have an average pore size of from about 40 to about 200 microns, preferably from about 75 to 100 microns, most preferably about 80 microns. The glass mat should be from about 5 to 50 mils in thickness, preferably about 20 mils thickness.

The coating layer is formed of natural rubber and is applied to at least one of the exposed surfaces of the separator. Preferably, it is applied to at least the side of the separator closest to the negative Plate. More preferably, that side of the separator will be the exposed surface of the base web, the surface opposite that to which the glass mat is attached. If desired, both the exposed surface of the base web and the exposed surface of the glass mat may have a coating layer.

Alternatively or additionally, the natural rubber coating layer may be applied to one or both major surfaces of the base web before the saturation with a latex binder, if used, or before the bonding of the glass mat. Likewise, the coating layer may be applied to the glass mat before it is bonded to the base web. Further, the coating layer may be applied to the base web after it has been saturated with the rigid latex binder, but before the bonding of the glass mat. Lastly, the coating may be applied during or subsequent to the application of the separately formed ribs, if used. As can be appreciated, the timing of the application and location of the coating layer is not critical to the present invention so long as it provides the desired top of charge and antimony poisoning Properties and does not adversely affect the other characteristics of the separator or the battery.

The coating layer is preferably applied as a latex or a dispersion and then dried or cured upon the surface to which it is applied. Alternatively, one may form the coating layer as a microporous, form stable, self supporting sheet and attach it to the desired surface by various means such as by an adhesive along the adjourning outer edges, heat bonding, mechanical crimping or other mechanical means such as clips. Regardless of the manner in which the layer is applies, it must allow for electrolyte flow through its structure. The latex or dispersion is thus preferred as they tend to form a porous structure.

It is preferred that the coating layer be formed as a latex of natural rubber with typical well known dispersion aids and/or curing agents, such as sulfur and that the latex be applied to the desired surface by spraying, dipping or coating such that the natural rubber coating layer comprises from about 1 to about 10% by weight of the finished separator, preferably from about 1 to 5%, more preferably from about 2 to 4% by weight.

The separator may be formed by any means conventional for forming multilayered laminates of materials such as these.

One preferred method of forming the separator is to separately form running lengths .g. multiple separator lengths) of the base web and glass mat layers, and apply an adhesive strip to the outer edges of the surface of base web to which the glass mat is to be bonded. The glass mat is then aligned with and bonded to the base web via the adhesive strips. The coating layer is then applied to at least the surface of the separator closest to the negative plate, preferably, this is the exposed surface of the base web. The application of the coating layer is preferably by a roll coater or spray nozzle such that a layer of about 0.5 to 4% of natural rubber by weight of the separator is applied. The separator is then cut to length.

Alternatively, pieces of base web and glass mat can be cut to a desired length, bonded together and then coated with the coating layer in a manner as set forth above.

Optionally, the base web/glass mat structure may be impregnated with a relatively stiff polymeric latex before the application of the coating layer. This latex tends to increase the stiffness of the finished separator which is a desirable trait in such batteries. The polymeric latex can be selected from any relatively stiff polymer systems including but not limited to styrene resins, epoxy resins, phenolic resins and mixtures thereof. A preferred latex is formed of equal proportions of a carboxylated polystyrene latex and a phenolic resin (based upon weight of solids).

The finished separator thus has a Positive plate engaging face, and a negative engaging face. It is preferred that the natural rubber layer form the negative plate engaging face when arranged in a battery between a positive and negative plate.

The separator has an overall thickness of from about 40 to about 150 mils, preferably about 60 to 100 mils. The average pore size for the finished separator should be less than 10 microns, Preferably less than 5 microns and more preferably less than 3 microns.

Electrical resistance should be as low as possible, however for deep cycle batteries, the level of electrical resistance need not be as low as that required for automobile starting batteries. Preferably the electrical resistance will be less than 60 milli-ohms-inch square, more preferably less than 50 milli-ohms-inch square.

The following example is illustrative of a preferred embodiment of the present invention.

EXAMPLE

A base web, made according to the processes of U.S. Pat. Nos. 4,216,281 and 4,265,985 was formed from 31% of a 3 micron average diameter glass fiber, 20% of 1 micron average diameter glass fiber, 10% of polyester staple fiber, 0.25 inch long with a 16 micron average diameter, 28% of silica, 3% polyethylene pulp and 8% of a latex binder formed of equal amounts of carboxylated polystyrene and a phenolic resin. (All amounts by weight of the base web).

A glass mat was formed of 40% by weight 2.5 micron average diameter glass fibers of random lengths 10% of 0.25 inch × 15 micron average diameter glass fiber, 15% of 0.5 inch by 15 micron average diameter glass fiber, 10% of 0.25 inch polyester staple fiber having a 1.5 dernier, 10% polyethylene pulp, 10% acrylic latex binder, 3% alum and 2% retention aid by the process of U.S. Pat. Nos. 4,216,281 and 4,265,985. (All amounts by weight of the glass mat).

PVC Plastisol ribs about 40 mils in height were extruded on to one of the two major surfaces of the base web and cured. The glass mat was attached to the major surface of containing the ribs the base web by an acrylic adhesive applied to the tops of the ribs. The base web and glass mat combination were then saturated with latex formed of equal portions of a carboxylated polystyrene and a phenolic and a phenolic resin and dried at 300° F. for about 20 minutes. The side of the separator having the exposed major surface of the base web, which in this embodiment would face the negative plate, was then sprayed with a diluted solution of natural rubber latex so as to deposit about 0.5 to 5% natural rubber (by weight of the separator) on the separator surface.

The separator had an overall thickness of 99 mils, an average pore size of 2.8 microns and an electrical resistance of 40 milli-ohms-inch-square.

The separator of the present invention has excellent characteristics and provides an improvement over existing separators in performance, ease of manufacture, cost and availability. Moreover, the use of the natural rubber coating has been found to reduce the potential for antimony poisoning and to positively affect the Top of Charge behavior of the battery. Additionally, when a synthetic paper or a microporous extruded sheet is used as the base web, the rate and frequency of dendritic growth and its resulting shorting of the plates is substantially reduced.

While the present invention has been described in reference to its preferred embodiments, other variations, modifications and equivalents would be obvious to one skilled in the art and it is intended in the specification and appended claims to include all such variations, modifications and equivalents therein.

What we claim:

1. A battery separator comprising a microporous plastic sheet material having two major surfaces, a glass mat layer adjacent one of the major surfaces as the sheet material and a coating of natural rubber latex applied to either an outer surface of the glass mat or a major surface of the sheet material opposite the surface adjacent the glassmat or both.

2. The battery separator of claim 1 wherein the sheet material has an average pore size of less than 15 microns and the sheet material is formed from about 1 to about 70 weight percent of a fiberous polyolefin synthetic pulp, about 15 to 65 weight percent of an inorganic filler and about 1 to about 35 weight percent of a long polymeric staple fiber and a dernier of about 0.5 to about 12.

3. The battery separator of claim 1 wherein the glass mat is formed of one or more glass fibers, a stable polymeric fiber at least 0.25 inch in length, a polymeric pulp and an acrylic latex impregnant.

4. The battery separator of claim 1 wherein the coating formed of a of natural rubber latex.

5. A battery separator comprising:
 a. a base web having two major surfaces and being formed of 31% by weight of the web of a 3 micron average diameter glass fiber, 20% by weight of a 1 micron average diameter glass fiber, 10% by weight of a staple polymeric fiber, 28% by weight of an inorganic filler, and 8% of a binder formed of carboxylated polystyrene and phenolic resin;
 b. a glass mat bonded to one of the two major surfaces of the base web and being formed of about 40% by weight of the glass mat of 2.5 micron average diameter glass fiber, about 10% by weight of the glass mat of a 0.25 inch long glass fiber, about 15% by weight of the glass mat of a 0.5 inch long glass fiber, about 10% by weight of the glass mat of a staple polymeric fiber selected from the group consisting of polyester, polyethylene and acrylic fibers, about 10% by weight of the glass mat of plastic pulp, about 10% by weight of the glass mat of polymeric binder, 3% by weight of alum and 2% by weight of one or more retention aids;
 and c. a natural rubber coating layer applied to at least the exposed surface of the separator adjacent the negative plate, the coating being in an amount of from about 1 to about 10% by weight of the separator.

6. The separator of claim 5 wherein the base web has a series of ribs formed on at least one of its major surfaces.

7. The separator of claim 5 wherein the base web and glass mat are impregnated with an additional binder before application of the natural rubber coating layer.

8. The separator of claim 5 wherein the coating layer is applied to the exposed surface of the base web.

9. A battery separator comprising a sheet product formed of a microporous base web having a first and second major face, and an average pore size of less than 5 microns, wherein the base web is selected from the group consisting of microporous, polyolefinic extruded sheets, synthetic papers, polyvinyl chloride sheets and phenolic aldehyde impregnated cellulosic sheets; a glass mat bonded to the first major surface of the base web and a natural rubber coating layer applied to the second major face of the base web.

10. The battery separator of claim 9 wherein the base web has one or more ribs on at least its first major surface.

11. The battery separator of claim 9 further comprising a second coating layer on an exposed surface of the glass mat.

12. A lead acid battery with at least one positive plate, at least one negative plate, a battery separator between each positive and negative plate and an electrolyte, the battery separator comprising a microporous base web having a first and second major surface, a glass mat bonded to the first major surface and a natural rubber coating layer applied to the second major surface of the base web, the battery separator being arranged between the positive and negative plates such that the natural rubber layer is adjacent the negative plate.

13. The lead acid battery of claim 12 wherein the base web is a synthetic paper having an average pore size of less than 5 microns and a thickness of about 20 mils.

14. The lead acid battery of claim 12 wherein the first major surface of the base web contains a series of ribs.

15. A battery separator comprising a sheet material having a positive plate engaging face and a negative plate engaging face, the sheet material being comprised of a microporous synthetic paper base web having two major surfaces, a glass mat bonded to one of the two major surfaces of the base web and a natural rubber coating applied to the sheet material such that it forms the negative plate engaging face of the sheet material.

16. The battery separator of claim 15 wherein the base web contains a series of ribs on at least one of its major surfaces.

17. The battery separator of claim 15 wherein the glass mat forms the positive plate engaging face of the sheet material.

18. A battery separator, comprising a microporous plastic sheet material selected from the group consisting of synthetic papers, a homogeneous polyolefinic sheet, and polyvinyl chloride sheets; the sheet material having two major surfaces, a glass mat layer adjacent one of the major surfaces of the sheet material, and a natural rubber coating applied to one or more major surfaces of the separator.

19. A battery separator comprising a microporous base web selected from the group consisting of synthetic papers, homogeneous polyelefinic sheets, polyvinyl chloride sheets and phenolic aldehyde impregnated cellulosic sheets; the base web having two major surfaces, a glass mat adjacent one of the major surfaces of the base web so as to form a separator having two major exposed surfaces and a natural rubber coating applied to at least one of the two major exposed surfaces of the separator.

20. A battery separator comprising a microporous base web selected from the group consisting of synthetic papers, homogeneous polyolefinic sheets, polyvinyl chloride sheets and phenolic aldehyde impregnated cellulosic sheets; the base web having two major surfaces, a glass mat adjacent of the major surfaces of the base web and a natural rubber coating applied to one or more surfaces of the base web or glass mat.

* * * * *